R. T. F. DODDS.
ROLLER MILL.
APPLICATION FILED APR. 20, 1915.

1,218,634.

Patented Mar. 13, 1917.
3 SHEETS—SHEET 1.

WITNESSES
R A Balderson
Jesse B. Heller

INVENTOR
R. T. F. Dodds
by Bakewell, Byrnes & Parmelee
Attys.

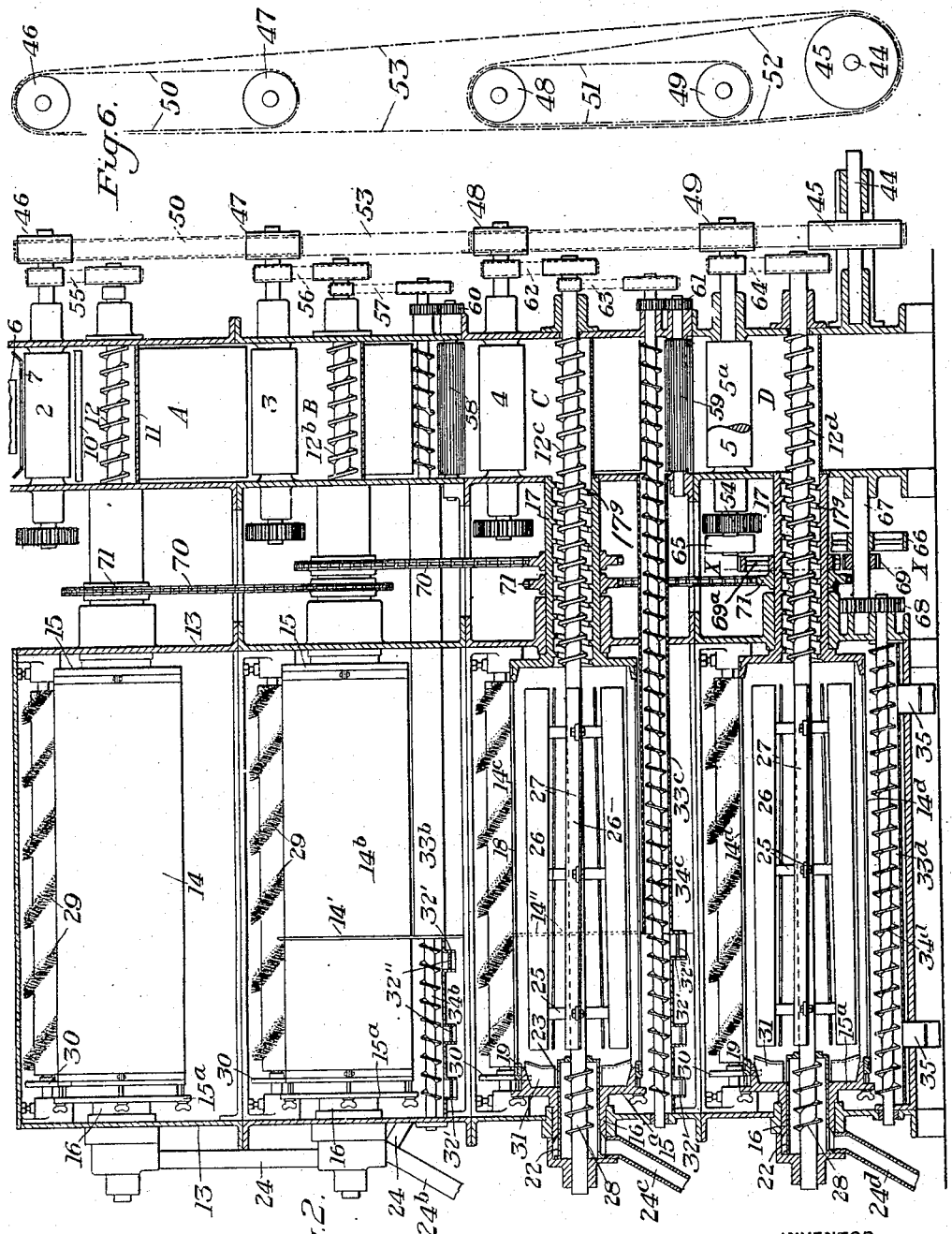

R. T. F. DODDS.
ROLLER MILL.
APPLICATION FILED APR. 20, 1915.
1,218,634.
Patented Mar. 13, 1917.
3 SHEETS—SHEET 3.
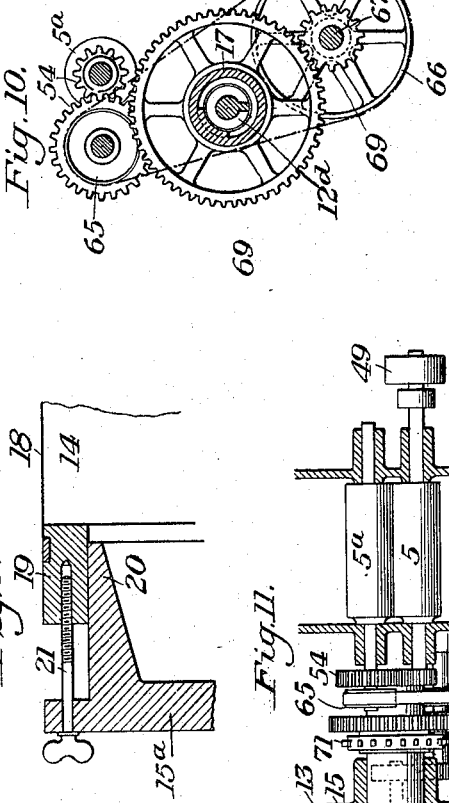
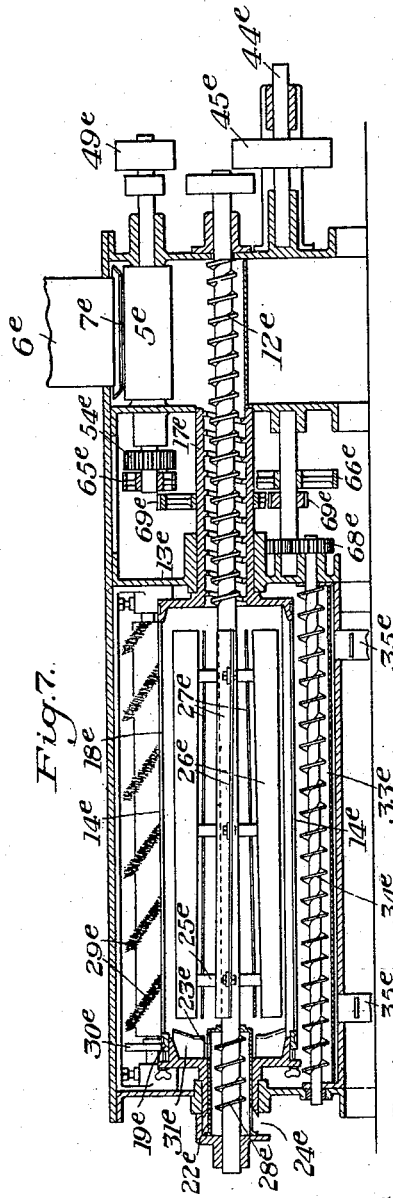
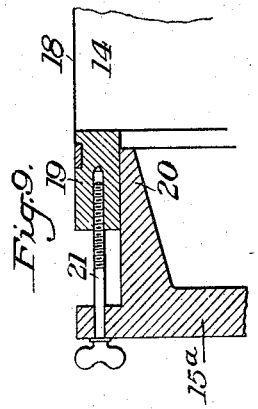
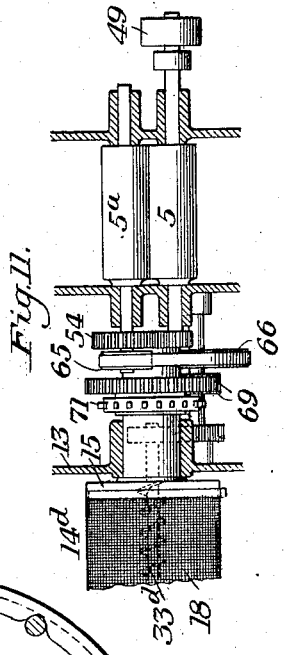
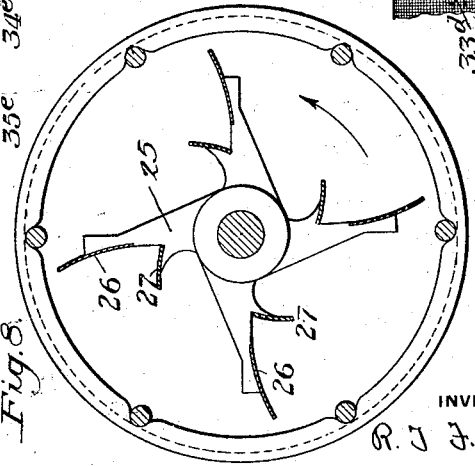
WITNESSES
INVENTOR

UNITED STATES PATENT OFFICE.

ROWAN T. F. DODDS, OF CHICAGO, ILLINOIS.

ROLLER-MILL.

1,218,634.  Specification of Letters Patent.  Patented Mar. 13, 1917.

Application filed April 20, 1915. Serial No. 22,570.

*To all whom it may concern:*

Be it known that I, ROWAN T. F. DODDS, a citizen of the United States, residing at Chicago, in the county of Cook and State of Illinois, have invented a new and useful Improvement in Roller-Mills, of which the following is a full, clear, and exact description, reference being had to the accompanying drawings, forming part of this specification, in which:

Fig. 2 is an irregular vertical section through the mill.

Fig. 6 is a diagram illustrating some of the power driven belts.

Fig. 7 is a view similar to Fig. 2 showing a modified form of mill, in which only one set of rolls is used.

Fig. 8 is a detailed sectional view through the frame of one of the bolts.

Fig. 9 is a detailed sectional view illustrating the bolting cloth stretching apparatus.

Fig. 10 is a detailed sectional view on the line X—X of Fig. 2; and

Fig. 11 is a detailed plan view somewhat diagrammatic illustrating the driving connections for the mills shown in Fig. 7, or the lower section of the mill shown in Fig. 2.

My invention has relation to an improvement in roller mills, and is designed to provide a compact form of mill which can be placed on a single floor of a building, and which is so arranged that it will not be necessary to utilize elevators for carrying the ground material from one floor to another, or from one unit of the mill to another. My improved mill is composed of a plurality of independent mill units, each unit comprising grinding elements, a bolting reel of novel character, and a substantially horizontal conveyer for conveying ground material from the grinding elements to the bolting reel. In the case of a mill composed of a plurality of units, the units, or some of them, may also be provided with horizontal return conveyers for conveying the coarser material back to the grinding elements of a subsequent unit.

My invention also provides a number of other and novel features which will be hereinafter pointed out.

Figure 4:
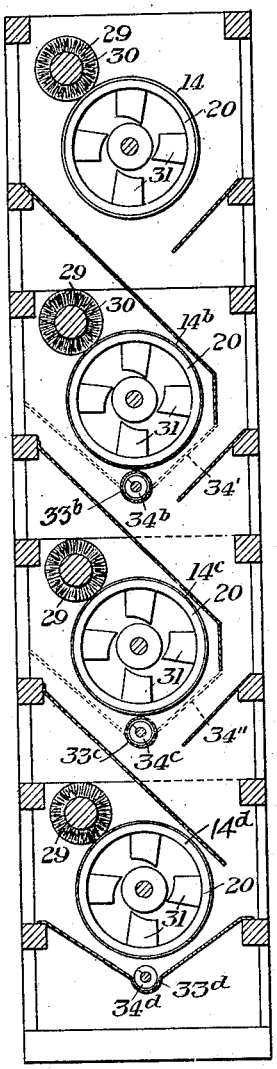
Fig. 4 is a sectional view through the bolting compartments of the mill.
Figure 3:
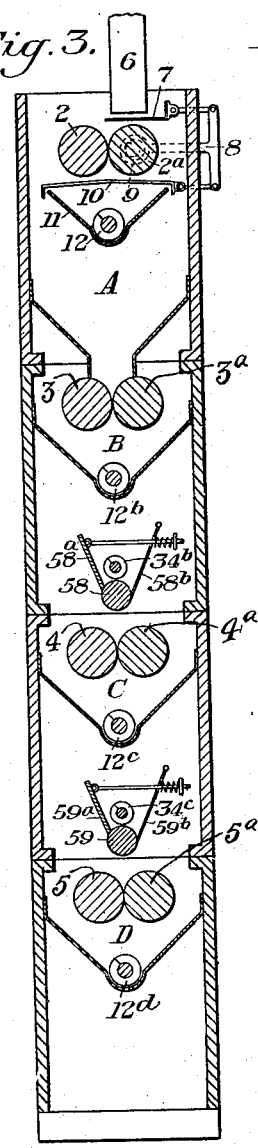
Fig. 3 is a sectional view through the roll compartments.
Figure 1:
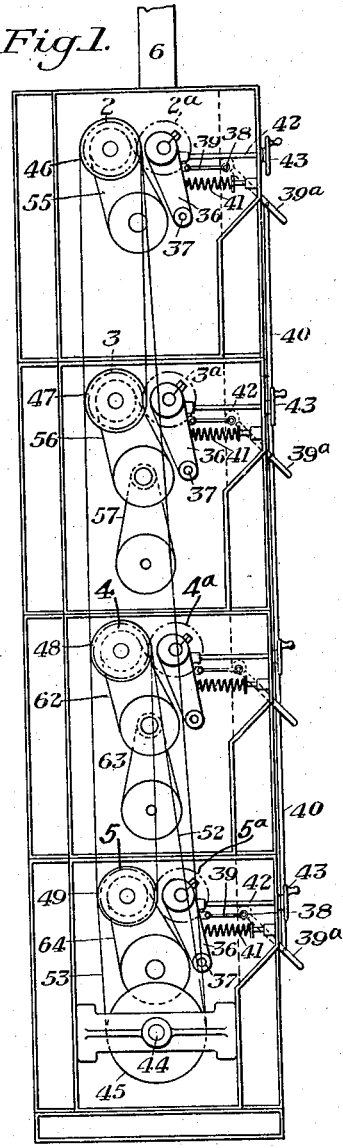
Figure 1 is a side elevation generally diagrammatic of one form of my improved mill.
Figure 5:
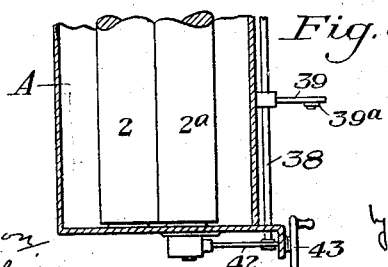
Fig. 5 is a detailed sectional plan view of a part of the rolls.

Referring to the construction shown in Figs. 1 to 4, 2 and $2^a$ designate one set of rolls in a compartment A; 3 and $3^a$ designate a second set of rolls in a compartment B; 4 and $4^a$ designate a third set of rolls in a compartment C and 5 and $5^a$ designate a fourth set of rolls in a compartment D. These various sets of rolls are rotatably mounted in journals in the frame-work forming their respective compartments, the rolls 2, 3, 4 and 5 being driven at one speed, while the rolls $2^a$, $3^a$, $4^a$ and $5^a$ are driven at a different speed, in order to grind the material fed between each set of rolls. 6 is a chute through which the grain is fed to a reciprocating plate 7, which is connected to an eccentric rod 8 acted upon by an eccentric 9 on the shaft of the roll $2^a$. This eccentric rod is also connected to a screen 10 over a hopper 11 in the compartment A. The ground material after passing between the rolls 2 and $2^a$ is deposited upon the screen 10, the finer material passing through the screen 9 into the hopper 11, while the coarser material drops off the sides of the screen into the bottom of the compartment A and is passed between the second set of rolls 3 and $3^a$, and thence to the bottom of the hopper in the compartment B.

Rotatably mounted in the bottom of the hopper 11 is a screw conveyer 12, and located in the bottom of the compartments B, C and D are similar conveyers $12^b$, $12^c$ and $12^d$, respectively, which are arranged to convey the ground material to their respective bolting reels.

Rotatably mounted in bearings in casings 13 of the respective mills are bolting reels 14, $14^b$, $14^c$ and $14^d$, which rotate about the axis of the conveyers 12, $12^b$, $12^c$ and $12^d$, respectively. Each of these bolting reels comprises a head 15 at one end and a head $15^a$ at the other end. The heads $15^a$ are provided with sleeves 16 which are rotatably mounted in bearings in the frames 13 of the respective mills, while the heads 15 are provided with sleeves 17 which inclose their respective conveyers, and are also rotatably mounted in bearings in their respective casings 13. The sleeves 17 are each provided with helical ribs $17^g$ on their inner faces which will assist in conveying the material from their respective hoppers to their bolting reels, and as the conveyers and sleeves rotate at different speeds as hereinafter described, the material while being fed toward the bolting reels will be disintegrated, so as to break up any lumps and pass it to the bolting reels in a granulated form and in the finest possible shape. Mounted on the periphery of each of the heads 15 is the usual bolting-cloth, one end thereof is fastened directly to the heads 15 by a steel band, while each bolting cloth is secured to a ring 19 by a steel band. The rings 19 are on flanges 20 on the heads 15, and the bolting cloths are held under tension by means of screws 21, which pass through flanges on the heads 15ª, see Fig. 9. Located within each of the sleeves 16 of the bolting reels is a stationary sleeve 22, which is closed at both ends, but is provided with an opening 23 for receiving material from within the bolting reels as hereinafter described, and is also provided with a chute for transferring the material from the sleeve 22 to a suitable point as hereinafter described. Connected to the shafts of each of these conveyers 12, 12ᵇ, 12ᶜ and 12ᵈ are spiders 25, and connected to the outer ends of the arms of these spiders are blades 26 which are arranged to throw the material within the reel against the cloth by a centrifugal action.

27 are blades connected to the intermediate portions of said arms and which are so shaped that they create a slight suction or centripetal action within the reel. This suction of the blades acts to draw the light or woody parts of the ground material, amounting to about one-fifth of the weight of the flour toward the center of the bolt. As both the blades 26 and 27 extend more or less in a helical direction this light woody material or "ash" will be moved toward the tail end of the reel, together with the coarse material which will not pass through the bolted cloth. This tendency of the light woody material to be moved in this direction is also increased by the fact that the outlet is at this end, this outlet affording the only means for the escape of the air which is drawn into the reel through the bolting cloth by the suction action. The light material is, therefore, forced out through the openings 23 in the sleeves 22 and passes therefrom into the chutes or discharges 24. Connected to the left-hand ends of the shafts of the conveyers and the agitators are spiral conveyers 28 which are arranged to feed the material from the openings 23 in the sleeves 22 to the discharge chutes.

In order to cleanse the outer surfaces of the bolts, I provide brushes 29 which are journaled in bearings in the casings 13 of the mills, and each of the shafts of these brushes are provided with friction-disks 30 which engage the heads 15ª of the bolting reels, so that the brushes are rotated by means of the heads 15ª. Mounted within each of the bolting reels on the heads 15ª are a series of buckets 31 which are arranged to lift the coarser material which will not pass through the bolting cloth and deposit it in the openings 23 in the sleeves 22, so that the heavy material will also pass out with the fine woody material.

Mounted below the bolting reel 14ᵇ is a conveyer tube 33ᵇ, 33ᶜ is a conveyer tube below the bolting reel 14ᶜ and 33ᵈ is a hopper below the bolting reel 14ᵈ. Rotatably mounted in these tubes are screw conveyers 34ᵇ and 34ᶜ, respectively, and 34ᵈ is a conveyer in the hopper 33ᵈ. Extending from the hopper 34ᵈ are a plurality of chutes 35 for carrying off the flour to any convenient point.

The rolls 2, 3, 4 and 5 are mounted in fixed bearings, while each of the rolls 2ª, 3ª, 4ª and 5ª is mounted in movable bearings 36, there being one bearing at each end of the roll, which are pivoted to the frames of their respective mills at 37. Journaled in bearings at the back of the frames are shafts 38 having eccentrics thereon which engage eccentric straps having links 39 connected to the bearing members 36, so that when the shafts 38 are rotated the rolls 2ª, 3ª, 4ª and 5ª will be moved from their respective rolls 2, 3, 4 and 5. Connected to each of these shafts 38 is a lever arm 39ª, and 40 is a link connected to all of the lever arms, so that when one of the arms is raised the remainder of the arms will be simultaneously raised, thereby shifting all of the rolls simultaneously. Any one or all of the lever arms 39ª may be extended to form an operating handle by means of which the link 40 can be actuated to effect the shifting of the rolls. 41 are pressure springs which normally bear against bearings 36. 42 are screw shafts connected to the bearings 36 and are provided with hand wheels 43, the hand wheels and screw shafts being arranged to hold the rolls so that only a predetermined amount of pressure of springs 41 which engage the bearings 36 will hold the rolls in contact with each other.

44 is a driving shaft which may be driven from any suitable source of power and is provided with a driving pulley 45, by which the four mills are driven. 46 is a driving pulley on the shaft roll 2, 47, 48 and 49 are driving pulleys on the shafts of the rolls 3, 4 and 5, respectively for driving the individual mills. 50 is a driving belt connecting pulleys 46 and 47, 51 is a driving belt connecting pulleys 48 and 49, 52 is a driving belt connecting pulleys 45 and 48, this last belt overlapping the belt 51, and 53 is a belt connecting pulleys 46 and 45, and which belt overlaps the belt 50 on the pulley 46 and the belt 52 on the pulley 45, so that one roll of each mill is driven directly from the main driving pulley 45. The other rolls of each set being driven by means of gears 54, see Fig. 10.

As the gears 54 are of different diameters, it will readily be seen that one roll of each set is driven at a higher rate of speed than the other roll, so as to cause a grinding action between the rolls. 55 is a belt connecting the pulley on the shaft of the roll 2 with the pulley on the shaft conveyer 12, 56 is a belt connecting the pulley on the roll shaft 3 with the pulley on the shaft of the conveyer 12$^b$, which shaft is in turn connected by a belt 57 with a pulley on the shaft of the conveyer 12$^b$ and a pulley on the shaft of the conveyer 34$^b$.

The ends of the conveyer tubes 33$^b$ and 33$^c$ open into compartments 58$^a$ and 59$^a$ over the grinding rolls 4, 4$^a$ and 5, 5$^a$, and contain distributing rolls 58 and 59, respectively. The distributing roll 58 is driven by means of gearing 60 from the shaft of the conveyer 34$^b$, while the roll 59 is driven by similar gearing 61 from the shaft of the conveyer 34$^c$. 58$^b$ and 59$^b$ are spring pressed pivoted plates forming one wall of each of their respective compartments, 58$^a$ and 59$^a$, the lower edges thereof bear against their distributing rolls and together with the distributing rolls are arranged to equally distribute the material to be ground along the grinding rolls.

The conveyer 12$^c$ is driven by a belt 62 which engages a pulley on the shaft of the roll 4 and a pulley on the shaft of the conveyer 12$^c$, and the conveyer 34$^c$ is driven by means of a belt 63 from the shaft of the conveyer 12$^c$. 64 is a belt connecting the pulley on the roll 5 to a pulley on the shaft of the conveyer 12$^d$. Connected to the shaft of the roll 5$^a$ is a pulley 65 which is belted to a pulley 66 on a shaft 67, which in turn is connected by means of gears 68 with the shaft of the conveyer 33$^d$ and by gears 69 with the sleeve 17 on the bolting reel 14$^d$. The various sleeves of the bolting reels 14, 14$^b$, 14$^c$ and 14$^d$ are connected by means of sprocket chains 70 on sprocket wheels 71, so that all of the bolting reels are rotated in the same direction by the shaft 67.

The bolting reels 14 and 14$^d$ are covered from end to end with bolting cloth of very fine mesh, while the right hand ends of bolting reels 14$^b$ and 14$^c$ beyond the partitions 14$'$ and 14$''$, which divide the respective compartments containing the bolting reels 14$^b$ and 14$^c$ into two compartments are covered with bolting cloth of fine mesh and the left hand ends with bolting cloth of coarse mesh. The conveyer tubes 32$^b$ and 32$^c$ are provided with chutes 32$'$ having control gates 32$''$ which are adapted to be opened when making whole wheat or Graham flour as hereinafter described.

The material to be ground is fed through the chute 6 to the plate 7, and thereby evenly distributed between the rolls 2 and 2$^a$, the ground material falling on the sieve 10, the finer portions thereof being sifted in the hopper 11 while the coarser portions pass to the rolls 3 and 3$^a$. The fine material in the hopper 11 is fed by means of the conveyer 12 to the bolting reel 14, the flour which passes out through the bolting cloth falls to the hopper 33$^d$, while the coarser material is conveyed by the buckets 31 in the reel, and the woody portions which are separated by the centripetal action of the agitator pass down through chute 24 to the conveyer tube 33$^b$. The material in the conveyer tube 33$^b$ is fed by means of conveyer 34$^b$ to the rolls 4 and 4$^a$. The material which has been ground by the rolls 3 and 3$^a$ is fed by conveyer 12$^b$ to the bolting reel 14$^b$, the flour which passes through the fine cloth drops into the hopper 33$^d$, while the coarser material which drops on the tail board 34$'$ is carried into the conveyer tube 33$^b$ and is fed to the rolls 4 and 4$^a$, while the coarser and woody portions from the bolting reel are carried off by chute 24$^b$. After the material has passed through rolls 4 and 4$^a$ it is carried by means of conveyer 12$^c$ to the bolting reel 14$^c$, the flour passing through the fine cloth drops into the hopper 33$^d$, while the coarser portions drop onto the tail board 34$'$ and are conveyed through the conveyer tube 33$^c$ by means of the conveyer 34$^c$ to the rolls 5 and 5$^a$, while the coarser portions within the bolting reel and the fine woody particles are carried off through chute 24$^c$. The material from the rolls 5 and 5$^a$ is fed by means of conveyer 12$^d$ to the bolting reel 14$^d$, the flour which passes through the bolting cloth is dropped into the hopper 33$^d$, while the other particles are passed out through the chute 24$^d$ to any suitable source, and the flour is removed from the bottom of the hopper 33$^d$ by means of the conveyer 34$^d$ which conveys it to suitable outlet chutes 35, through which it passes to a suitable source.

If it is desired to make Graham or whole wheat flour the gates 32$''$ in the chutes 32$'$ communicating with the conveyers 32$^b$ and 32$^c$ are left open, so that the flour or material passing through the coarser portions of the cloth surrounding the bolting reels 14$^b$ and 14$^c$ will pass directly to the hopper 33$^d$.

In Fig. 7 I have shown a single mill in which I have designated all of the parts with a similar reference character with the letter $e$ affixed. In this mill the rolls can be set close enough to do all of the grinding and the ground material is conveyed by means of the conveyer 12$^e$ to the bolting reel 14$^e$, the refuse passing off through the chute 24$^e$ and the flour being conveyed to the chutes 35$^e$ by means of the conveyer 33$^e$.

The advantages of my invention are numerous. It will be noted that by reason of the fact that each of the units composing the mill is structurally separate and independent of the other units, any desired number of such units can be used in the construction of any particular mill, according to the purpose for which it is intended. The driving mechanism for these units is so arranged that the belt connections for driving the grinding elements and the conveyer shafts can be readily made at the head end of the machine, the belts being arranged in substantially vertical lines and in compact form. The arrangement of the driving mechanism is very flexible, enabling driving connections to be made to any desired number of units. The driving connections for the external members of the bolting reels, it will be noted, are located intermediate the grinding elements and the bolting reels, thus leaving the tail end of the machine free from all driving mechanism and greatly facilitating inspection of the operation of the mill.

It will be further noted that all the conveyers are substantially horizontal screw conveyers, no bucket elevators being required either for conveying the material to or from the bolting reels. The feature of providing the bolting reels with sleeve extensions at their head ends and providing such sleeve extensions with interiorly arranged disintegrating means, causes the material from the grinding elements to be delivered to the bolting reels in a condition free from lumps, and whereby a most effective separation of the flour particles can be effected in the reel. These sleeve extensions also form driving members and the connections from one reel to another can be readily made from these extensions.

The peculiar form of agitators which I employ in the bolting reels is also a feature of great advantage, since not only is the material properly agitated and fed through the reel by the action of the main set of agitator blades, but the provision of the auxiliary blades 27, or their equivalent, which create a slight suction within the reels, effectively separates out all the woody and fibrous parts of the ground material, which is discharged separately at the end of the reel. The agitators are driven at a relatively high rate of speed, and much faster than the bolting cloth, and this relatively high speed not only greatly facilitates the separation of the flour but also the suction action described. This causes the reels to act as purifiers. It will further be noted that the bolting reels are closed except for the meshes of the bolting cloth, so that all air drawn into the interior of the reels by the suction action described must necessarily pass through the meshes of the cloth, thereby keeping the latter clear and free from clogging. Clogging on the outside is prevented by the action of the rotary brushes which extend the entire length of the reels, even in those units in which the reels are divided into two compartments.

A further advantage of my invention results from the provision of means in the conveyer passages of some of the reel units, whereby the material therein can be directly discharged without passing to another set of grinding elements. This enables me to use the same mill in the manufacture of Graham or whole wheat flour, or in the grinding of buckwheat or rye, without any change in the mill or in the bolting reels. All that is necessary is to open the gates, which will permit a direct discharge into the flour bin or hopper.

I claim:

1. In a flour mill, a rotatable bolting reel having a central discharge opening at its tail end, and an agitator within the reel, said agitator having blades extending longitudinally within the reel and arranged to throw the material outwardly against the bolting surface of the reel, the reel also having means therein for creating a centripetal suction action to draw the lighter particles of the material toward the center of the reel and toward said discharge opening, substantially as described.

2. In a flour mill, a rotatable bolting reel and an agitator having blades extending longitudinally within the reel, and also having means for creating suction action toward the center of the reel, said reel being closed except for the openings through its cloth and a central discharge opening at the tail end thereof, whereby the air drawn in by the suction means is compelled to pass through and clear the cloth and passes outwardly through the central discharge opening, substantially as described.

3. In a flour mill, a rotatable bolting reel having an agitator provided with means for creating both a centripetal and centrifugal action, whereby the heavier particles of the material will be thrown outwardly and the woody and fibrous particles will be drawn toward the center of the reel, there being a central discharge opening through the tail end of the reel for such particles, substantially as described.

4. A bolting reel having a closed end at the head end thereof, with the exception of a central feed opening therethrough which is closed up by the material being fed into the reel, an agitator within the reel, means for rotating the agitator and the reel, said rotating means being arranged to rotate the agitator relative to the reel, said agitator having longitudinal blades arranged to throw the heavier material against the walls of the reel by centrifugal action, and a second set of blades arranged to suck air through the bolting cloth and to draw the lighter woody particles toward the center of the reel and force them in a longitudinal direction in the central portion of the reel to the tail end thereof; the reel having a discharge opening for such particles at said end, substantially as described.

5. In a flour mill, a bolting reel provided with an internal agitator having means for throwing the material outwardly against the bolting surface of the reel, and having other means located near the center of the reel for creating an inward suction toward such center, the reel also having a discharge opening for the lighter material separated out by such suction action, substantially as described.

6. A flour mill having a bolting reel provided with a rotatable internal agitator having helically arranged longitudinal blades arranged to draw the lighter material or ash to the central portion of the tail end of the reel, the reel having at its tail end a hollow casing member extending into the tail end of the reel and formed with an opening communicating with the reel for the discharge of said material, together with a conveyer on the agitator shaft within the said casing member, substantially as described.

7. In a flour mill, a rotatable bolting reel, a screw conveyer for conveying the material to the reel, a tube for said conveyer communicating with the reel and connected thereto, means for rotating the tube and the reel, means for rotating the screw conveyer, and means on the inner wall of the tube to coact with the screw conveyer to disintegrate the material fed by the conveyer; substantially as described.

8. In a flour mill, a rotatable bolting reel having an agitator provided with centrifugally acting blades, the agitator also having means for creating a suction action through the bolting surface of the reel toward the center thereof, the reel having a central discharge opening at one end portion, and also having means for discharging through said opening the material drawn thereto by such suction action, substantially as described.

9. In a flour mill, a rotatable bolting reel having a closed end at the head end thereof, an agitator provided with a plurality of main blades extending in a general longitudinal direction but in helical lines, and also having another set of blades set nearer the axis of the agitator, the two sets of blades producing a combined centrifugal and centripetal action, substantially as described.

10. In a flour mill, a rotatable bolting reel having a closed end at the head end thereof, an agitator provided with a plurality of main blades extending in a general longitudinal direction but in helical lines, and also having another set of blades set nearer the axis of the agitator, the two sets of blades producing a combined centrifugal and centripetal action, together with means for rotating the agitator at a higher speed than the body of the reel, substantially as described.

11. In a flour mill, the combination with a rotatable bolting reel, of a screw conveyer for conveying the material into said reel, said reel being provided with a casing member surrounding the said conveyer and having disintegrating and feeding means on its inner surface, and means for rotating both the conveyer and the casing member, substantially as described.

12. In a flour mill, the combination with a rotatable bolting reel, of a screw conveyer for conveying the material into the reel, said reel being provided with a member surrounding the said conveyer and having feeding and disintegrating means, and driving mechanism for rotating the conveyer and said member at different rates of speed, substantially as described.

13. In a flour mill, a rotatable bolting reel having means for creating an insuction through its bolting surface toward the center of the reel and endwise thereof, the reel having an end discharge opening for the material drawn thereto by such suction action, substantially as described.

14. In a flour mill, a rotatable bolting reel having a centrally located discharge opening at one end thereof, a casing member into which said opening leads and which is provided with a discharge opening, a screw conveyer working within said casing member, and means within the reel for sucking the lighter particles of the material toward the center of the reel and toward said centrally located discharge opening, substantially as described.

15. In a flour mill, a rotatable bolting reel having a centrally located discharge opening at one end thereof, a casing member into which said opening leads and which is provided with a discharge opening, a screw conveyer working within said casing member, and means within the reel for sucking the lighter particles of the material toward the center of the reel and toward said centrally located discharge opening, the reel having at its opposite end a centrally located inlet opening arranged to be normally closed by the incoming material, substantially as described.

16. A flour mill comprising grinding elements, a bolting reel having its head provided with a sleeve extension, said sleeve extension carrying driving means between the reel and the grinding elements, substantially as described.

17. A flour mill comprising grinding elements, a bolting reel having its head provided with a sleeve extension, said sleeve extension carrying driving means between the reel and the grinding elements, and also forming a conveyer casing, substantially as described.

18. A flour mill comprising grinding elements, a bolting reel having its head provided with a sleeve extension, said sleeve extension carrying driving means between the reel and the grinding elements, and also forming a conveyer casing, said casing having internal disintegrating means, substantially as described.

In testimony whereof, I have hereunto set my hand.

ROWAN T. F. DODDS.

Witnesses:
 E. M. DODDS,
 H. C. DEAN.

Copies of this patent may be obtained for five cents each, by addressing the "Commissioner of Patents, Washington, D. C."